Patented Dec. 19, 1950

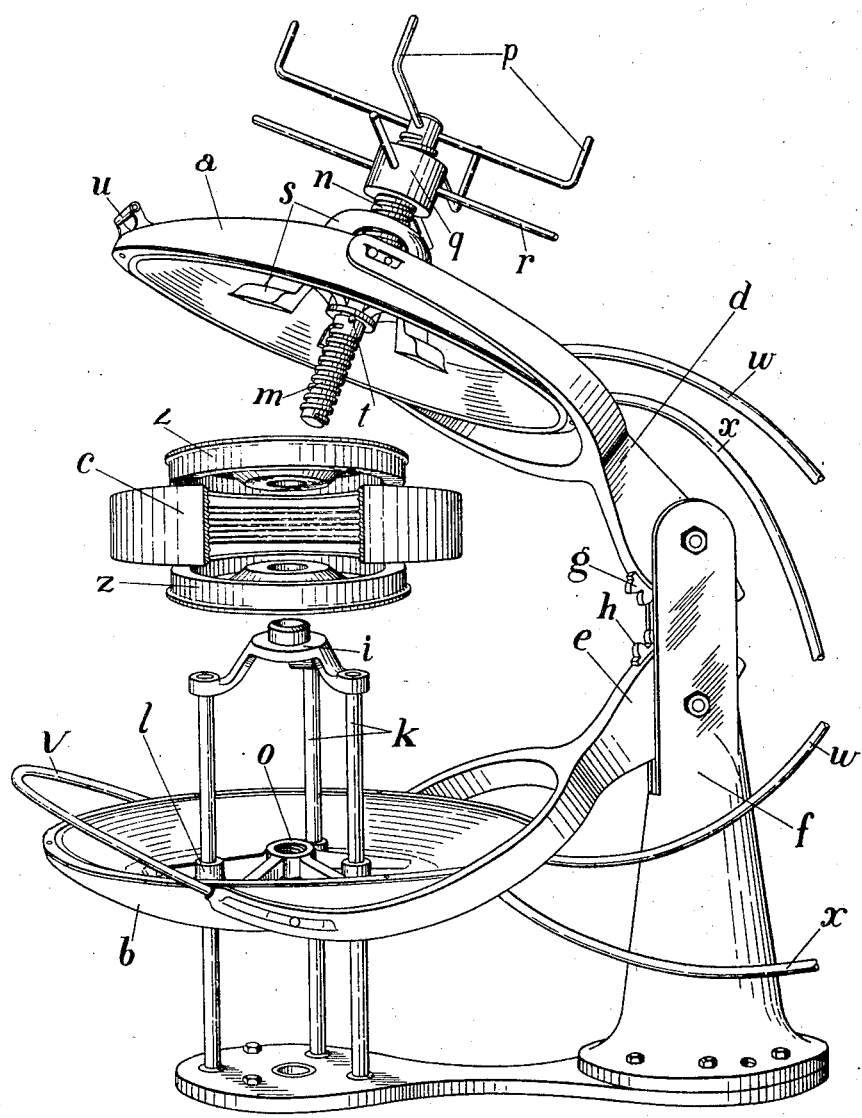
INVENTOR
EDGAR CHARLES WOODS

2,534,845

UNITED STATES PATENT OFFICE 2,534,845

VULCANIZING APPARATUS

Edgar Charles Woods, Stockport, England, assignor to Henry Simon Limited, Stockport, England Application January 6, 1948, Serial No. 699
In Great Britain January 6, 1947

7 Claims. (Cl. 18—18)

This invention relates to vulcanizing apparatus for use in the manufacture of tires or for the treading or re-treading of the same, the invention having particular reference to vulcanizing apparatus of the type comprising two mold members (each formed from one or more parts) adapted to be brought together to form a cavity in which the tire or a part of the same is enclosed during the vulcanizing process, and to be clamped together in such tire enclosing position, and in which the two mold members act as counterweights to one another.

Such apparatus as hitherto constructed requires some mechanical means for opening or closing the members such as motor-driven screws, hydraulic or pneumatic cylinders, or in those cases where the opening and closing is effected by manual force exerted by the operator it is necessary to provide counterbalance weights by reason of the weight of the members which the operator is called upon to move.

The object of the present invention is to simplify the construction and arrangement of apparatus of the general type above referred to by obviating the necessity for any considerable force to be applied to bring the heavy mold members together or to open the same while at the same time eliminating any special counterweights thereby allowing the operation to be performed by expending considerably less effort.

The invention consists in vulcanizing apparatus of the kind referred to wherein the mold members are supported each on one end of a lever the other end of each lever being pivotally supported upon a part of the frame of the apparatus, the pivoted ends of the levers being connected by intermeshing gearing.

Further features of the invention will be apparent from the description given hereinafter.

In carrying the invention into effect in one convenient manner as, for example, in its application to vulcanizing apparatus in which a re-treaded tire is vulcanized in the cavity between two horizontally disposed shoulder and side wall shaping heated mold members and a separate tread forming ring which locates circumferentially around its edges on the aforesaid mold members when the mold is closed, each mold member is carried at one end by an arm or lever, the other end of which is pivoted to an upright member of the framework of the machine. The pivoted ends of these arms or levers are connected together by intermeshing toothed quadrants or a link mechanism and the arrangement is such that lifting or lowering movement applied to one mold member simultaneously causes a lowering or lifting movement of the other member, and during these operations the weight of half of the mold acts as a counterbalance to the other half so that very little force is required to move these heavy parts.

The toothed quadrants and supporting arms are preferably similar in dimensions so that the movement of one member of the mold with reference to the horizontal central plane between the mold members is exactly the same as but in opposite sense to the movement of the other member and the arrangement therefore ensures the maintenance of a constant horizontal medial plane between the two halves of the mold for all degrees of separation between them as required for different widths of tire being processed.

When the two members of the mold are closed together they are clamped in position by means of a central screw carried in one mold member and engaging in a nut carried in the other. An advantage of the arrangement according to which the mold members are carried by arms is that rotation of the side wall molding plates is prevented and thus permanent connections for steam or other heating medium to the mold parts may be made by means of flexible hose or leads.

According to a further feature of the invention means are provided for ensuring accurate coincidence of the plane containing the sectional centre lines of the tire with the constant medial plane between the two movable members of the mold and the tread forming part. This may be accomplished, for example, by arranging that a centering plate carried by the rim or bead ring member of the mold on which the tire is mounted is such that its sectional centre line lies wholly in the medial plane of the tire and its beads when mounted and, by employing a constant thickness of plate for all rims or bead rings to be used with the machine, the height of the supporting table is so arranged that when the tire assembly is placed in molding position between the open parts of the mold its medial plane is coincident with the horizontal medial plane between the movable mold parts.

According to a further feature of the invention means are provided for ensuring accurate coincidence of the axis of the tire with the axis of the mold when closed. This may be accomplished, for example, by arranging that the axis of the rim which carries the tire is at all times coincident with the axis of the supporting table. In one embodiment the tire to be treated is positioned on the table supported rigidly from the framework of the machine, and a spigot or series of pins engaging in a corresponding hole or series of holes or slots cut in the centering plate attached to the rim, or bead ring parts of the mold, are arranged to ensure that whatever may be the size of tire it is positioned accurately on the constant axial centre-line to the two movable mold members.

If desired the heated parts of the mold members may be formed as separate parts, and may have heat insulating means disposed between them and the main mold members. They may also be formed on their inner faces with any suitable shaping or patterning means.

A further feature of the invention is that the rim or bead ring on which the tire is supported consists of an upper and lower flanged member, means being provided to hold the flanges together while between the two mold members. The central screw is provided with a second thread external to the mold halves and projecting from the top half of the mold. A nut arranged to travel on this second thread, engages with a loose collar to which are attached a number of legs forming a spider projecting through the ribs of the top part of the mold. The rim or bead ring employed to locate the top bead of the cover being treated is provided with a flange upon which the legs of the spider engage when the mold is closed. Then by screwing down the nut the two parts of the rim or bead rings may be clamped and held together against the table support on which the tire and lower part of the rim is placed when loading the mold. Thus the employment of separate locking devices on the rim member can be dispensed with and positive means for closing the rim can be used when the use of self-locking rims would be difficult.

Alternatively, the screw may be used in the manner described to close together the two halves of the rim and a separate locking mechanism may be used to lock the two halves together when the load can be removed from the mold structure by releasing the screw.

The drawing shows by way of example one embodiment of the invention in an apparatus for re-treading tires in which the upper mold member $a$ and the lower mold member $b$ and the separate tread forming ring $c$ are brought together to form a cavity within which is located the tire to be re-treaded. The inner surfaces of the mold members are provided with concentric stepped surfaces for engaging the periphery of the tread ring $c$.

The upper and lower mold members are supported upon like forked arms $d$ and $e$ which are pivotally mounted upon the upright posts $f$ of the frame of the machine. When in the vulcanizing position the common axis of the two mold members and the tread ring is vertical. The ends of the two forked arms where they are pivoted upon the upright post $f$ are provided with similar mutually engaging toothed quadrants so that when one mold member is moved the other mold member moves an equal amount in the opposite direction. The weights of the two mold members and their distances from the pivots are substantially the same in each case, and thus the weight of the one is balanced by the weight of the other and little effort is required to open and close the mold.

As the two toothed quadrants are similar the angular movement of one forked arm will be the same as that of the other forked arm. In consequence of this and as the two mold members are the same distance from their pivots the mold members will always be equidistant on either side of a fixed horizontal plane passing through the centre of the tread ring when supported at its vulcanizing position, within sufficient limits to accommodate the largest tires. Because of this, tires of different tread widths can be re-treaded in the one machine without the need of any prior adjustment of the same.

The tire, preparatory to vulcanizing, is provided with a tread ring $c$. One half of a tire rim $z$ is first placed on the support $i$ fixed to the pillars $k$, the tire is then placed on this and the other half tire rim placed on top. The tire rims used with different diameter and width tires are so constructed that the horizontal plane which passes through the centre of the tread is for all sizes the same distance above the surface of the support $i$, the tread ring is of course placed symmetrically with respect to the tread of the tire. A central hole in the centering plate of the rim engages on the spigot of the support $i$ thus ensuring accurate axial centering of the rim, mold tire and tread ring.

The lower mold member $b$ is provided with sliding bearings $l$ which engage upon the pillars $k$ to ensure that the member remains horizontal in every position, and accurately centered with respect to the supporting table $i$. The upper mold member $a$ is provided with a screw-threaded bolt of large diameter $n$ above the mold member and smaller diameter $m$ below the mold member so as to provide a shoulder for engaging the upper surface of the latter. The points of attachment of the upper mold member to the upper forked arm $d$ allow of slight relative movement to enable the bolt $m$ to be inserted within and withdrawn from the bore $o$ in the lower mold member while angular displacement is taking place between the upper and lower forked arms. The lower mold member is attached to the lower forked arm by means of pins engaging slots in the latter which allows relative movement between the mold member and the forked arm while the latter describes an arcuate movement about its pivot while the mold member moves along a vertical line.

Upon the two mold members being brought together upon the tread ring $c$ the screw-threaded bolt $m$ is screwed into the threaded bore $o$ in the lower mold member by means of the handles of the handles $p$ and tightened up to hold the two members tightly in contact with the tread ring. The screw-threaded nut $q$ is then screwed down by means of the handles $r$ to engage the upper surface of the three-legged spider $s$ which in turn engages the upper half of the tire rim $z$ carrying the tire to hold the two halves rigidly together and in position upon the support $i$. The pin $t$ is provided in the screw-threaded bolt $m$ to prevent this bolt from being removed from the upper mold member when the bolt is withdrawn to release the two mold members and also to ensure positive breaking action of the mold.

The handles $u$ and $v$ are provided so that the operator can the more easily handle the parts of the mold to open and close them. Connections are made in convenient positions by means of flexible steam flow and return pipes $w$ and $x$ to supply the heat for the vulcanizing process.

The invention has been described above with particular reference to an apparatus for re-treading tires, but the invention is equally applicable to apparatus for the molding or manufacture of tires and to apparatus in which each mold member is formed as a single part or comprises a number of parts, and the invention is not limited to the particular details of construction described herein but the details may be varied without departing from the scope of the invention.

I claim:

1. Tire vulcanizing apparatus of the kind referred to having a pair of levers, each lever being pivotally supported at one end at a different point upon the frame of the apparatus, supporting means upon each free end of the levers to support a mold member thereon and intermeshing gearing interconnecting the pivoted ends of the levers.

2. Tire vulcanizing apparatus of the kind referred to having a pair of levers, each lever being pivotally supported at one end at a different point upon the frame of the apparatus, supporting means upon each free end of the levers to support a mold member thereon, said mold members being at equal distances from the respective pivots when in the vulcanizing position and intermeshing gearing interconnecting the pivoted ends of the levers.

3. Tire vulcanizing apparatus of the kind referred to having a pair of levers, each lever being pivotally supported at one end at a different point upon the frame of the apparatus, supporting means upon each free end of the levers to support a mold member thereon and similar toothed quadrants interconnecting the pivoted ends of the levers.

4. Tire vulcanizing apparatus of the kind referred to having a pair of levers, each lever being pivotally supported at one end at a different point upon the frame of the apparatus for movement in a vertical plane, supporting means upon each free end of the levers to support a mold member thereon, the supporting means for one mold member allowing rotation of the latter about the associated lever, guide means for the last mentioned mold member to keep it in a horizontal position while being moved towards and away from the other mold member and intermeshing gearing interconnecting the pivoted ends of the levers.

5. Tire vulcanizing apparatus of the kind referred to having a pair of levers, each lever being pivotally supported at one end at a different point upon the frame of the apparatus, supporting means upon each free end of the levers to support a mold member thereon, a screw threaded axial bolt upon one of the mold members, a screw threaded axial hole in the other mold member for engagement by the said axial bolt to draw the members together to ensure they are coaxial upon closing the mold, and intermeshing gearing interconnecting the pivoted ends of the levers.

6. Tire vulcanizing apparatus of the kind referred to having a pair of levers, each lever being pivotally supported at one end at a different point upon the frame of the apparatus, supporting means upon each free end of the levers to support a mold member thereon, intermeshing gearing interconnecting the pivoted ends of the levers and supporting means for supporting a tire horizontally and equidistant between and coaxial with the mold members when they are in the vulcanizing position.

7. Tire vulcanizing apparatus of the kind referred to having a pair of levers, each lever being pivotally supported at one end at a different point upon the frame of the apparatus, a screw threaded axial bolt upon one of the mold members, a screw threaded axial hole in the other mold member for engagement by the said axial bolt to draw the members together and to ensure they are coaxial upon closing the mold, a flanged rim in two halves for supporting a tire horizontally and equidistant between and coaxial with the mold members when they are in the vulcanizing position, engaging means upon the axial bolt for engaging the upper part of the flanged rim to press it down upon the lower part of the same after the mold is closed and intermeshing gearing interconnecting the pivoted ends of the levers.

EDGAR CHARLES WOODS.

REFERENCES CITED

The following references are of record in the file of this patent:

UNITED STATES PATENTS

| Number | Name | Date |
|---|---|---|
| 1,590,377 | Johnson | June 29, 1926 |
| 1,624,343 | Johnson | Apr. 12, 1927 |
| 1,715,851 | Macbeth | June 4, 1929 |
| 2,199,000 | Johnson | Apr. 30, 1940 |